United States Patent Office 3,509,782
Patented May 5, 1970

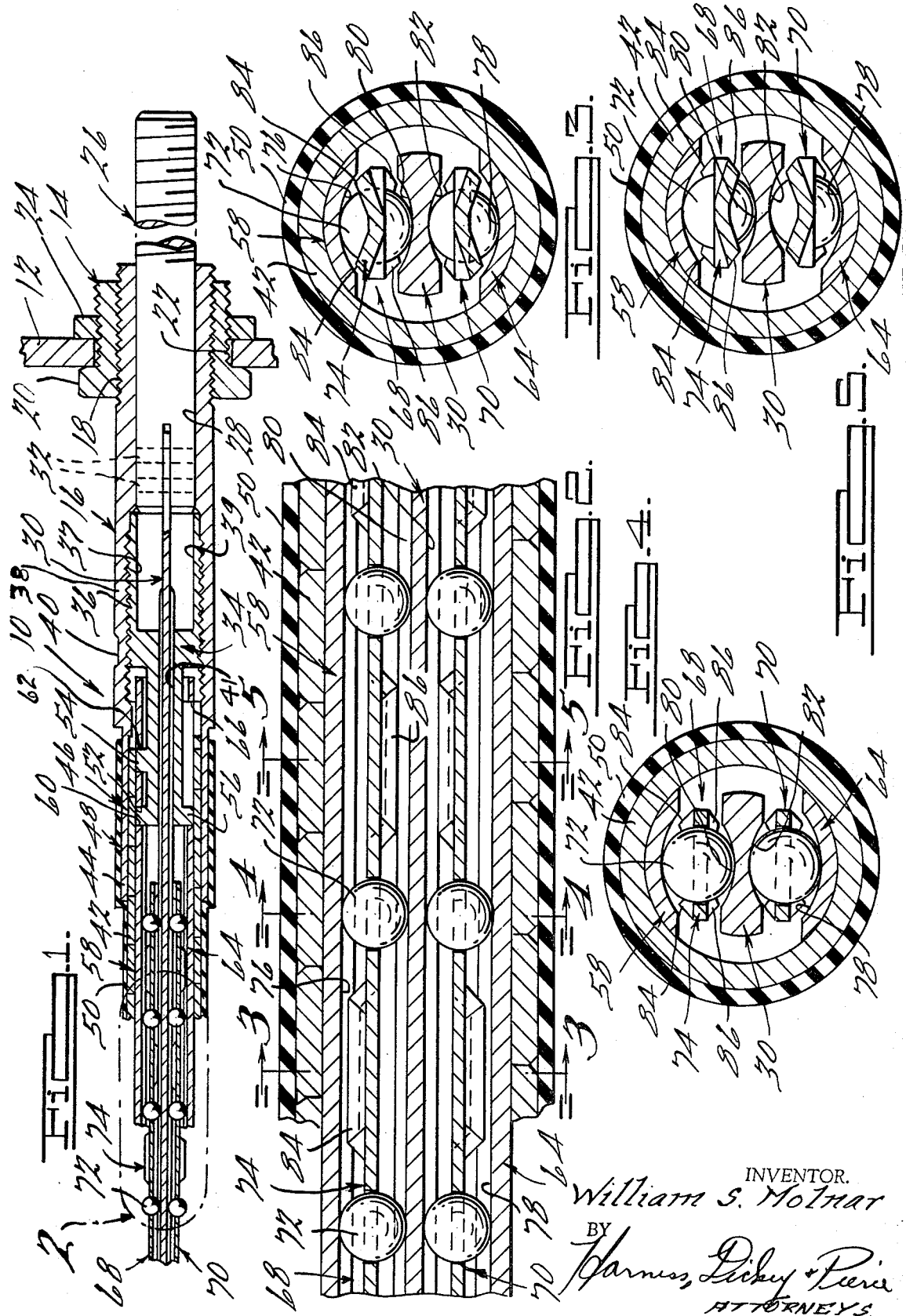

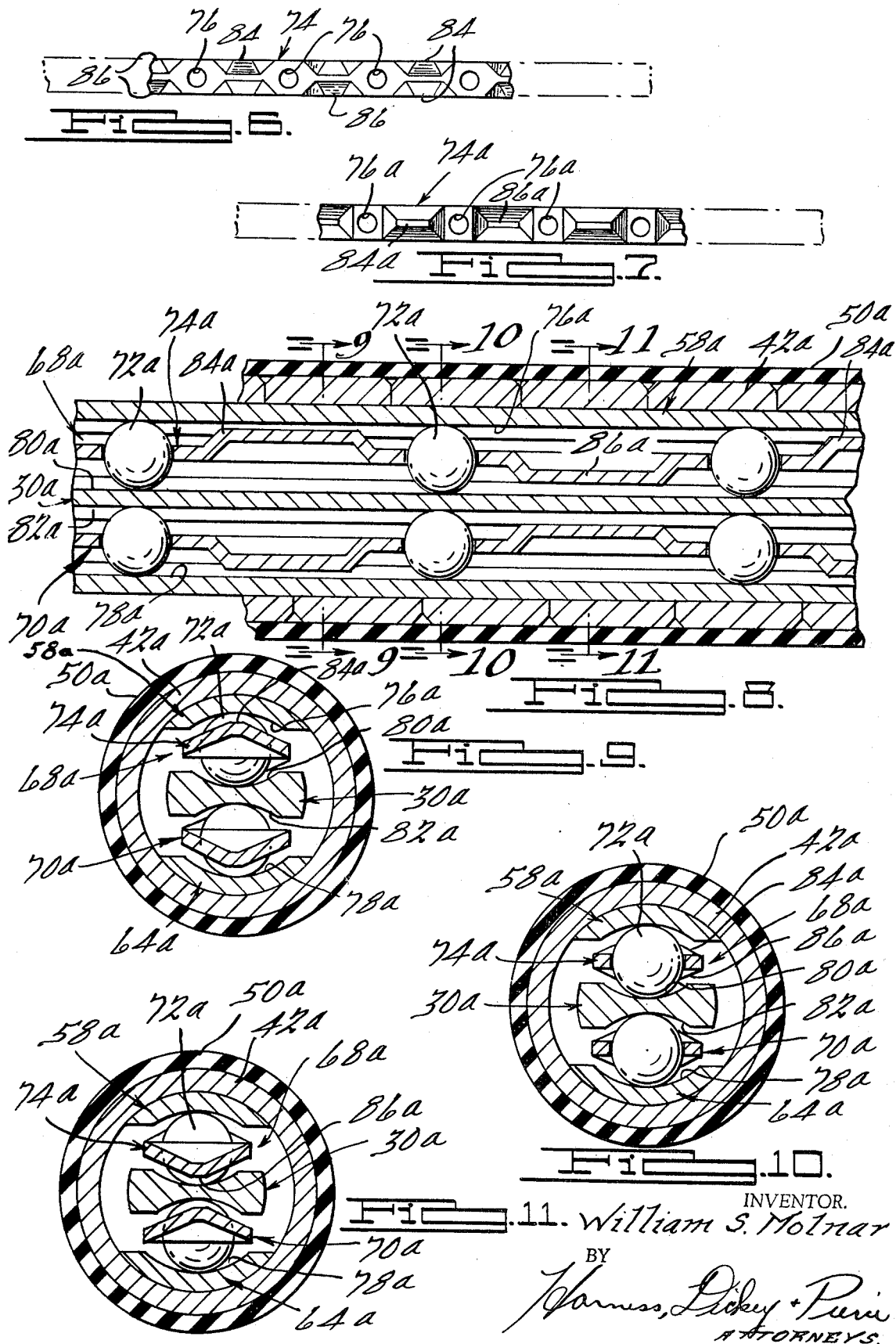

3,509,782
FLEXIBLE CONTROL CABLE
William S. Molnar, 1506 Southfield Road,
Birmingham, Mich. 48009
Filed Dec. 11, 1967, Ser. No. 696,678
Int. Cl. G05g 7/02
U.S. Cl. 74—501                    13 Claims

ABSTRACT OF THE DISCLOSURE

A flexible control cable for transmitting tensile or compressive forces by means of a band member which is supported between a plurality of ball members which ball members are held in place by a retainer and supported between a pair of race or guide members.

---

The present invention relates to a flexible control cable for transmitting tensile and/or compressive forces.

The present invention discloses in general a new and improved flexible control cable construction and specifically includes novel retainer constructions and a novel support construction for the flexible cable.

Therefore, it is an object of the present invention to provide an improved flexible control cable.

It is another object of the present invention to provide a new and improved flexible control cable having a new and improved retainer construction.

It is still another object of the present invention to provide a new and improved control cable having new and improved means for supporting the control cable.

Other objects, features, and advantages of the present invention will become apparent from the subsequent description and the appended claims, taken in conjunction with the accompanying drawings, in which:

FIG. 1 is a longitudinal sectional view of a control cable embodying features of the present invention;

FIG. 2 is a view to increased scale of a portion of the cable of FIG. 1 enclosed by the dot-dashed lines and indicated by the numeral 2 in FIG. 1;

FIGS. 3, 4 and 5 are sectional view tken substantially along the lines 3—3, 4—4 and 5—5, respectively in FIG. 2;

FIG. 6 is a top elevational view of the retainer in the embodiment of FIGS. 2 through 5;

FIG. 7 is a top elevational view of a modified retainer construction;

FIG. 8 is a view to increased scale similar to the view of FIG. 2 and including the retainer of FIG. 7;

FIGS. 9, 10 and 11 are sectional views taken substantially along the lines 9—9, 10—10 and 11—11, respectively, in FIG. 8.

Looking now to FIGS. 1 through 6, a control cable is generally indicated by the numeral 10 and is shown mounted to a retaining wall structure 12 by means of a bushing assembly 14. The control cable 10 includes an outer tubular end member 16 having a bore extending therethrough. The outer end 18 of the end member 16 is threaded and is in threaded engagement with the threaded bore through a bushing member 20 of assembly 14. The bushing member 20 is supported in a through bore 22 in the retaining wall 12 and is fixed thereto by a retaining nut 24. While the bushing member 20 is held from rotation relative to the retaining wall 12 by means of nut 24, the end member 16 is free to threadably rotate within the bushing 20.

A control rod 26 is slidably supported within the end portion 28 of the bore through the end member 16. A generally flat flexible band member 30 is located coaxially within the cable 10 and is fixed to the control rod 26 by means of a pair of pins 32. Thus as the control rod 26 is moved in and out from the bore portion 28, the flexible band 30 will also be moved within the cable assembly 10. A connector member 34 is externally threaded at one end 36 and is threadably connected within a threaded portion 38 of the bore through end member 16. The connector member 34 has a generally enlarged bore portion 39 at one end which is generally the same diameter as the bore portion 28 of the end member 16 whereby the control rod 26 can move axially within both bores 28 and 39. A slot 41 extends diametrically through the opposite end of member 34 and intersects the bore 39; the bore 39 is generally of the same diameter as the width of the slot 41 and serves a purpose to be described. The connecting member 34 is first threadably fixed to the end member 16 and the end member 16 is swaged as at 40 whereby the connecting member 34 and the end member 16 are fixed together and hence will not rotate relative to each other. A tubular flexible sheath 42 is located within a reduced thickness extremity 44 at the inner end of the member 16. The connector member 34 extends partially within the sheath 42. The sheath 42, end portion 44 and connector 34 are swaged together as at 46 whereby relative rotation is prevented and the sheath 42 and portion 44 of the end member 16 are swaged together as at 48 whereby relative rotation therebetween is prevented. A flexible, resilient sheath or covering 50 is located over the sheath 42 and can be constructed of some suitable elastomeric material such as plastic or rubber.

The connecting member 34 has a pair of axially spaced ears or lugs 52 and 54 at one side and has a single lug or ear 56 at an opposite side and in line with the forwardmost lug 52 of the opposite pair. A first race or guide member 58 is provided with a pair of slots 60 and 62 which receive the ears 52 and 54, respectively, whereby relative axial movement of the first race member 58 is prevented. A second radially oppositely disposed race member 64 is provided with a generally elongated slot 66 which receives the ear 56 whereby limited axial movement of the race 64 is permitted. Note that the opposite end of the cable assembly 10 is preferably constructed in a manner identical to the construction previously described.

The connecting member 34 is fixed to the end member 16 whereby relative axial movement is precluded; this permits the connection between the race members 58 and 64 and the connecting member 34 to be made such that the race members 58 and 64 have a controlled amount of backlash; where required substantially zero backlash could be provided. This is a distinct advantage over cable in which the connecting member is not fixed such that backlash is inherent therein. By making the connecting member 34 a separate member from the end member 16 the slotted construction can be used with the end member 16 enclosing and sealing the slot 41; in cables in which the end member 16 and connecting member 34 are made integral, a through bore is used (a slot cannot be used since it would result in an open construction and, hence, for the same size a smaller opening for the band 30 would be available); thus, for the same sized cable the assembly 10 could have a larger band member 30 than a cable of the integral construction noted above and, hence, would have a greater capacity.

The band member 30 extends coaxially through the cable assembly 10 and between the two race members 58 and 64 and is held generally centrally in this position by means of first and second ball and retainer assemblies 68 and 70, respectively, with the first assembly 68 located between the flexible band 30 and the first race 58 and with the second assembly 70 located between the flexible band 30 and the second race 64. Since the ball retainer assemblies 68 and 70 are identical only one will be described. With the width of slot 41 and the diameter of bore 39 in member 34 being the same, the width of the band 30 and diameter of the control rod 26 can be substantially the same and, except for clearance provisions, can be the same as the width of slot 41; thus, by using the construction of connector member 34 as described, the load capacity of the cable 10 can be made a maximum.

The retainer assembly 68 included a plurality of ball members 72 and a retainer 74. The retainer 74 (see FIG. 6), is provided with a plurality of circular holes 76 which are of a size to receive the balls 72 in a clearance relation. The race members 58 and 64 are provided with generally arcuate raceways 76 and 78, respectively; at the same time the flexible band 30 acts as an inner race member and is provided on opposite surfaces with generally arcuately constructed raceways 80 and 82 which co-operate with the raceways 76 and 78, respectively.

The cable 10 is mounted within bushing assembly 14. The threaded connection provided between the bushing member 20 and the threaded end 18 permits relative rotation of the entire cable 10 thereby permitting the cable 10 to properly orient itself whereby its plane of maximum flexibility is located transversely to required planes of bending for the particular application of the flexible cable assembly 10.

It is important that the ball members 72 be securely held by the retainer 74 such that they cannot become dislodged from the circular openings 76. To accomplish this, the retainer 74 is provided with a plurality of projections 84 at one edge of the retainer 74 and a plurality of projections 86 located on the opposite edge of the retainer 74. The projections 84 and 86 are located between adjacent holes 76 and as formed at the opposite edges of the retainer 74 are raised to extend above the plane of the openings 76 (see FIGS. 3, 4 and 5). Note that the projections or raised edges 84 extend in one direction and alternate with raised edges 86 which extend in the opposite direction. Thus, with such a construction the retainer 74 is guided by the action of the raised edges 84 and 86 relative to the race member 58 and relative to the confronting surface of the flexible band 30 and radial movement of the retainer 74 is limited such that the openings 76 will be maintained generally in line with the centers of the ball members 72 whereby the ball members 72 will not be inadvertently dislodged from the openings 76.

An alternate construction is shown in FIGS. 7 through 11 in which components similar to the embodiment shown and described in FIGS. 1 through 6 are given similar numerical designations with the addition of the letter subscript *a*. There the retainer 74*a* has raised portions 84*a* and 86*a* which are located alternately between adjacent holes 76*a* and which extend radially in opposite directions (see FIGS. 8 through 11). The portions or projections 84*a* and 86*a* cooperate in a manner similar to the raised edges 84 and 86 with the associated race member 58*a* and flexible band 30*a* to limit the relative radial movement of the retainer 74*a* such that the openings 76*a* are generally maintained centrally of the ball members 72*a* whereby inadvertent displacement of the ball members 72*a* from the openings 76*a* is prevented.

Thus, with both the constructions shown and described, novel retainer constructions are disclosed for use with the flexible cable whereby the ball members are positively retained and cannot be inadvertently dislodged from their associated openings. In addition, a novel construction is shown including the bushing assembly 14 whereby the entire cable assembly 10 is free to rotate in order that its most flexible plane be properly presented to the required planes of bending.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. A flexible control cable comprising means defining a pair of co-extensively extending race members and ball and retainer means located between said race members, said ball and retainer means comprising a flexible retainer member extending generally co-extensively with said race members and including a plurality of spaced openings for receiving a plurality of ball members, said retainer having raised portions spaced from said openings and raised from the plane of said openings and engageable with one of said race members whereby with said raised portions engaging said one of said race members said spaced openings are generally maintained in the central portion of the space between said race members preventing movement of the ball members out from said openings said raised portions being located at opposite edges of said retainer and generally in between said spaced openings.

2. The cable of claim 1 with said raised portions between one pair of spaced openings extending toward one of said race members and with said raised portions between an adjacent pair of spaced openings extending toward the other of said race members.

3. The cable of claim 2 with said retainer having a generally V-shaped cross-section across co-operating pairs of said raised portions with the ends of the legs of the V spaced from the plane of said openings.

4. A flexible control cable comprising means defining a pair of co-extensively extending race members and ball and retainer means located between said race members, said ball and retainer means comprising a flexible retainer member extending generally co-extensively with said race members and including a plurality of spaced openings for receiving a plurality of ball members, said retainer having raised portions spaced from said openings and raised from the plane of said openings and engageable with one of said race members whereby with said raised portions engaging said one of said race members said spaced openings are generally maintained in the central portion of the space between said race members preventing movement of the ball members out from said openings, said raised portions being located generally in between the edges of said retainer.

5. The cable of claim 4 with said raised portions between adjacent pairs of spaced openings extending in opposite directions.

6. The cable of claim 5 with said retainer having a generally V-shaped cross-section across said raised portions with the apex of the V spaced from the plane of said openings.

7. A flexible control cable comprising means defining a pair of co-extensively extending race members and ball and retainer means located between said race members, said ball and retainer means comprising a flexible retainer member extending generally co-extensively with said race members and including a plurality of spaced openings for receiving a plurality of ball members, said retainer having raised portions spaced from said openings and raised from the plane of said openings and engageable with one of said race members whereby with said raised portions engaging said one of said race members said spaced openings are generally maintained in the central portion of the space between said race members preventing movement of the ball members out from said openings, an end connector at one end of said cable for supporting said cable to a support structure, said end connector being of a tubular construction, a separate tubular connecting member located within and fixed to said end connector, one of said pair of race members extending axially through said end connector and said connecting member, and means for securing the other of said race members to said connecting member.

8. A flexible control cable comprising means defining a pair of co-extensively extending race members, ball and retainer means located between said race members, an end connector at one end of said cable and support means for supporting said end connector to a support wall for rotation relative to said support wall.

9. The cable of claim 8 with said support means comprising a bushing, means fixing said bushing to the support wall, and means threadably connecting said end connector and said bushing whereby relative rotation of said cable in said bushing is permitted.

10. A flexible control cable comprising a pair of outer race members and an inner race member located between said outer race members, all of said race members extending generally coextensively, ball and retainer means located between each of said outer race members and said inner race member, a tubular end connector located at one end of said cable for supporting said cable to a support structure, a separate tubular connecting member located within said end connector, said connecting member having a through slot at its inner end and an enlarged bore at its outer end; said enlarged bore having a diameter generally at least as large as the width of said slot, said inner race member extending axially through said end connector and said connecting member and having a width substantially equal to the width of said slot, and securing means for securing said outer race members to said connecting members.

11. The cable of claim 10 with said securing means located between co-extending portions of said end connector and said connecting member with said end connector extending generally over said slot.

12. The cable of claim 10 with said tubular connecting member being fixed to said end connector and with said securing means comprising interconnected slots and lugs.

13. A flexible control cable comprising means defining a pair of co-extensively extending race members and ball and retainer means located between said race members, said ball and retainer means comprising a flexible retainer member extending generally co-extensively with said race members and including a plurality of spaced openings for receiving a plurality of ball members, said retainer having surface portions on opposite sides thereof of a dimension to be inclose clearance relaitonship with both of said race members whereby said surface portions by being engageable with said race members will generally maintain said spaced openings of said retainer in the central portion of the space between said race members preventing movement of the ball members out from said openings.

References Cited

UNITED STATES PATENTS

| | | | |
|---|---|---|---|
| 2,841,029 | 7/1958 | Richoux | 74—501 |
| 2,845,813 | 8/1958 | Richoux | 74—501 |
| 3,217,557 | 11/1965 | Martinot | 74—501 |
| 3,287,990 | 11/1966 | Ellinger | 74—501 |

FRED C. MATTERN, Jr., Primary Examiner

W. S. RATLIFF, Jr., Assistant Examiner